(12) United States Patent
Koball (10) Patent No.: US 7,753,389 B1
(45) Date of Patent: Jul. 13, 2010

(54) WATERCRAFT TRANSPORT SYSTEM

(76) Inventor: Ross Brandon Koball, 4645 Twilight St. Southeast, Rochester, MN (US) 55904

( * ) Notice: Subject to any disclaimer, the term of this patent is extended or adjusted under 35 U.S.C. 154(b) by 328 days.

(21) Appl. No.: 11/849,325

(22) Filed: Sep. 3, 2007

(51) Int. Cl.
*B60P 3/10* (2006.01)
(52) U.S. Cl. .................................. 280/414.1
(58) Field of Classification Search .............. 280/414.1
See application file for complete search history.

(56) References Cited

U.S. PATENT DOCUMENTS

| | | | | |
|---|---|---|---|---|
| 3,626,891 | A * | 12/1971 | Sessions | 440/11 |
| 4,395,185 | A * | 7/1983 | Whaley | 414/483 |
| 4,858,943 | A * | 8/1989 | Cote | 280/414.1 |
| 5,004,260 | A * | 4/1991 | Smyly, Sr. | 280/414.1 |
| 5,013,206 | A * | 5/1991 | Ernst et al. | 414/483 |
| 5,228,713 | A * | 7/1993 | Kovach | 280/414.1 |
| 5,332,249 | A * | 7/1994 | Solberg et al. | 280/414.1 |
| 5,725,228 | A * | 3/1998 | Livingston | 280/414.1 |
| 6,616,166 | B2 * | 9/2003 | Marchese | 280/414.1 |
| 7,055,449 | B2 * | 6/2006 | Brown | 114/263 |

* cited by examiner

*Primary Examiner*—Kevin Hurley
(74) *Attorney, Agent, or Firm*—Ojanen Law Offices, Ltd.; Karuna Ojanen

(57) ABSTRACT

A watercraft transport system having a trailer hinged to a floatable body. The trailer comprises a frame, an axle and wheels and is hinged at the front to the front of the floatable body. The hinge has a limited degrees of freedom for roll, pitch and yaw motion to allow the floatable body to float in the water but still substantially retain its position so that a personal watercraft can be loaded and unloaded from the trailer. The floatable body of the personal watercraft transport system floats on the surface of the water and easily allow the user of the personal watercraft to maneuver in and out of the floatable body. As the personal watercraft transport system is removed from the water, channels on the underside of the floatable body drop into the frame for self-alignment. The floatable body is molded in its interior periphery to accommodate the hull of a personal watercraft, and its upper surface may be coated with skid-proof material. Locking mechanisms are provided to secure the floatable body to the trailer and to secure the personal watercraft to the floatable body.

15 Claims, 9 Drawing Sheets

WATERCRAFT TRANSPORT SYSTEM

FIELD OF THE INVENTION

This invention relates generally to the field of watercrafts and more specifically relates to a storage and transport arrangement having a floatable body hinged to a trailer.

BACKGROUND OF THE INVENTION

Personalized watercraft are manual and motorized floatable craft intended to carry one or more persons, typically less than five people, on the surface of a body of water. Viewing FIG. 1, various circumstances for docking and undocking a personalized watercraft from a transportation trailer, as well as mounting and dismounting a personalized watercraft, are shown. Typically, a trailer 112 upon which the watercraft 110 is secured is connected to a vehicle 114 at a hitch 116 to transport the watercraft 110. The vehicle 114 is backed down a slanted ramp 118 into the water 120 and this already creates one of myriad of potentially difficult situations: depending upon the vehicle 114, it may be difficult for the driver of the vehicle 114 to observe the trailer 112 and the personal watercraft 110 when backing up. The ramp 118 may have a shallow or a severe slope of different surfaces ranging from slippery wet muddy earth to gently sloped ridged concrete; in any event, the surface is wet and usually slippery. The wheels 122 of the vehicle 114 may lose traction, especially when the vehicle is backed into the water too far or too deep. Although the trailer 112 sinks into the water 120, the rear 124 of the personal watercraft is buoyant and typically moves sideways on the surface of the water 120 requiring physical effort on the part of a the driver or a second person to keep the personal watercraft aligned. The trailer 112, moreover has metal surfaces with hard sharp edges that can hurt the user and/or cause damage to the hull of the personal watercraft. In the meantime, a user who is anxious to get into the water 120, must enter the water to load and unload the personal watercraft 110 and then crawl or jump onto the trailer with hard and sharp angles and surfaces to board the watercraft 110. Additionally, because the trailer is wet metal, it is slippery in the water.

Figure 1:
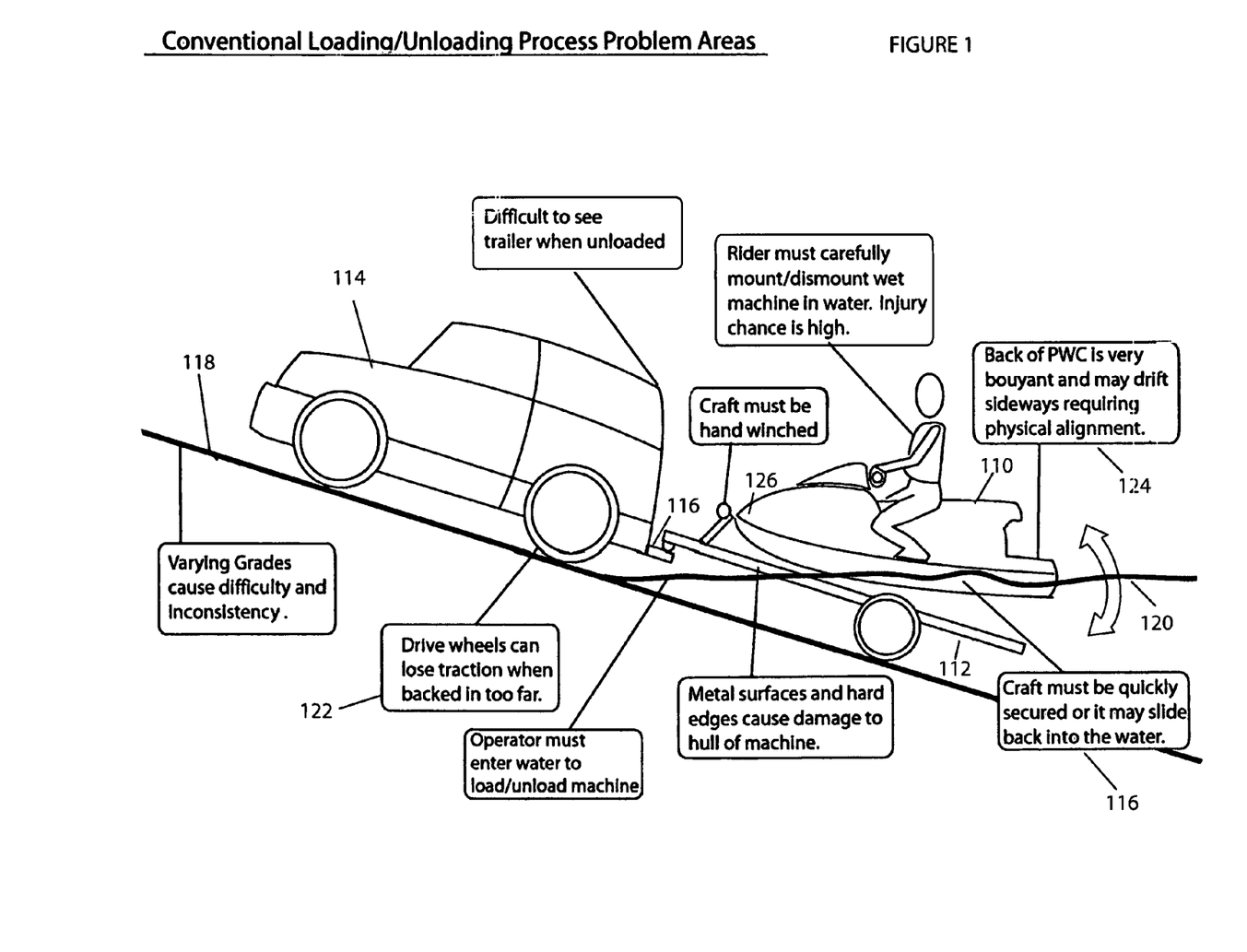
FIG. 1 is side view of a prior art trailer and a personal watercraft in a loading and an unloading position.

Returning the watercraft 110 to the trailer 112 has the same risks discussed above and then some: the personal watercraft 110 must be quickly secured onto the trailer 112 using a hand winch 126 or it will slide backwards and sideways (yaw) in the water 120; if no other person is available, the user must dismount the personal watercraft 110 and maneuver around the slippery hard and sharp edged metal of the trailer 112. The user may be exhausted from spending a hot sunny day on the water; or bad weather may increase the dangers. The risk of injury and lack of convenience is great.

There is thus a need for a different watercraft transport system that solves many of the problems stated above.

SUMMARY OF THE INVENTION

These needs and others are solved by a personal watercraft transportation assembly, comprising: a trailer having a frame, an axle, and wheels; a floatable body molded on the top side to accommodate the hull of a personal watercraft; and a hinge connecting the trailer to a front end of the floatable body so that when the trailer is at least partially submerged in water, the floatable body floats on the surface of the water. The hinge allows a range of motion for pitch to allow the floatable body to float as the trailer sinks into the water, and provides a smaller range of range of motion for roll and yaw. The frame may be a substantially rigid tube in a generally Y-shape having one extending tube with a forward direction and separating into separated extensions towards a rear direction of the frame. The extending tube preferably has an attachment mechanism to attach to a vehicle in the forward direction and further has an elevationally angled section substantially proximate to the separated extensions, the hinge being attached to the elevationally angled section. The substantially rigid tube may have one or more structural cross members between the separated extensions. The underside of the floatable body further comprises a generally Y-shaped channel to receive the generally Y-shaped rigid tube of the frame; and may have at least one roller along a longitudinal axis of the floatable body to facilitate movement of a personal watercraft into and out of the floatable body. It is contemplated that there is a releasable locking mechanism to secure a rear portion of the floatable body to a rear portion of the trailer.

While the invention has been briefly summarized, a full understanding and appreciation of the invention is set forth below in the detailed description of the invention and the accompanying drawing wherein the same element is given the same reference numeral throughout.

DESCRIPTION OF THE DRAWINGS

FIG. 9A is a side view of an interpretation of a person boarding a personal watercraft showing the floatation body and the trailer.

DETAILED DESCRIPTION OF THE INVENTION

Figure 2:
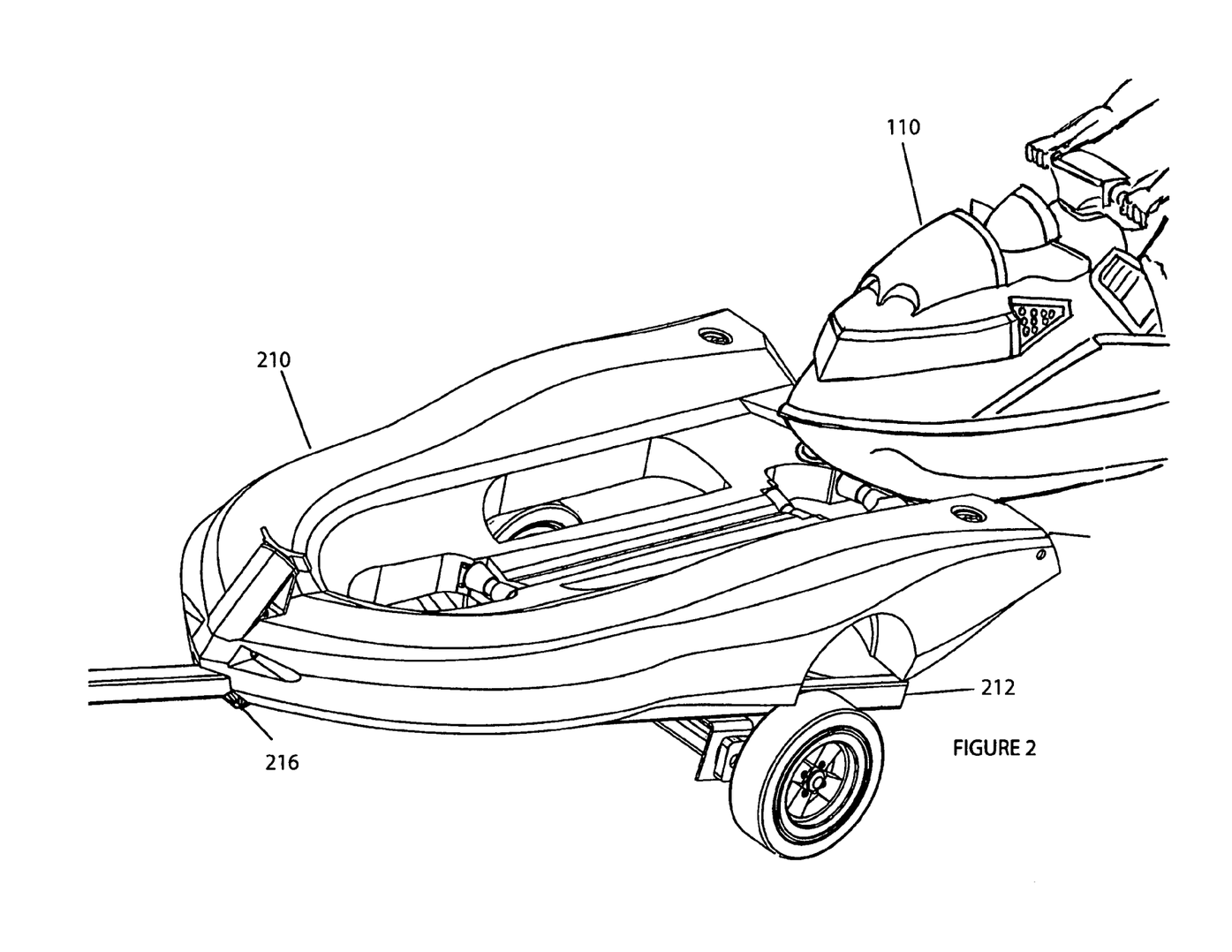
FIG. 2 is a perspective view of a personal watercraft transport system in accordance with features described herein.

With reference to FIG. 2, an embodiment of a personal watercraft transport system 210 is shown. The personal watercraft transport system 210 comprises a trailer 212 and a floatable body 214 as the flotation component. The floatable body 214 is removably attached to the trailer at a hinge 216 located at the front of the each of trailer 212 and the flotable body 214. The body 214 floats up and away from the trailer 212 when the personal watercraft transport system 210 is in the water. Features of the floatable body 214 and the trailer 212 are shown in greater detail in FIGS. 3-5.

Figure 3:
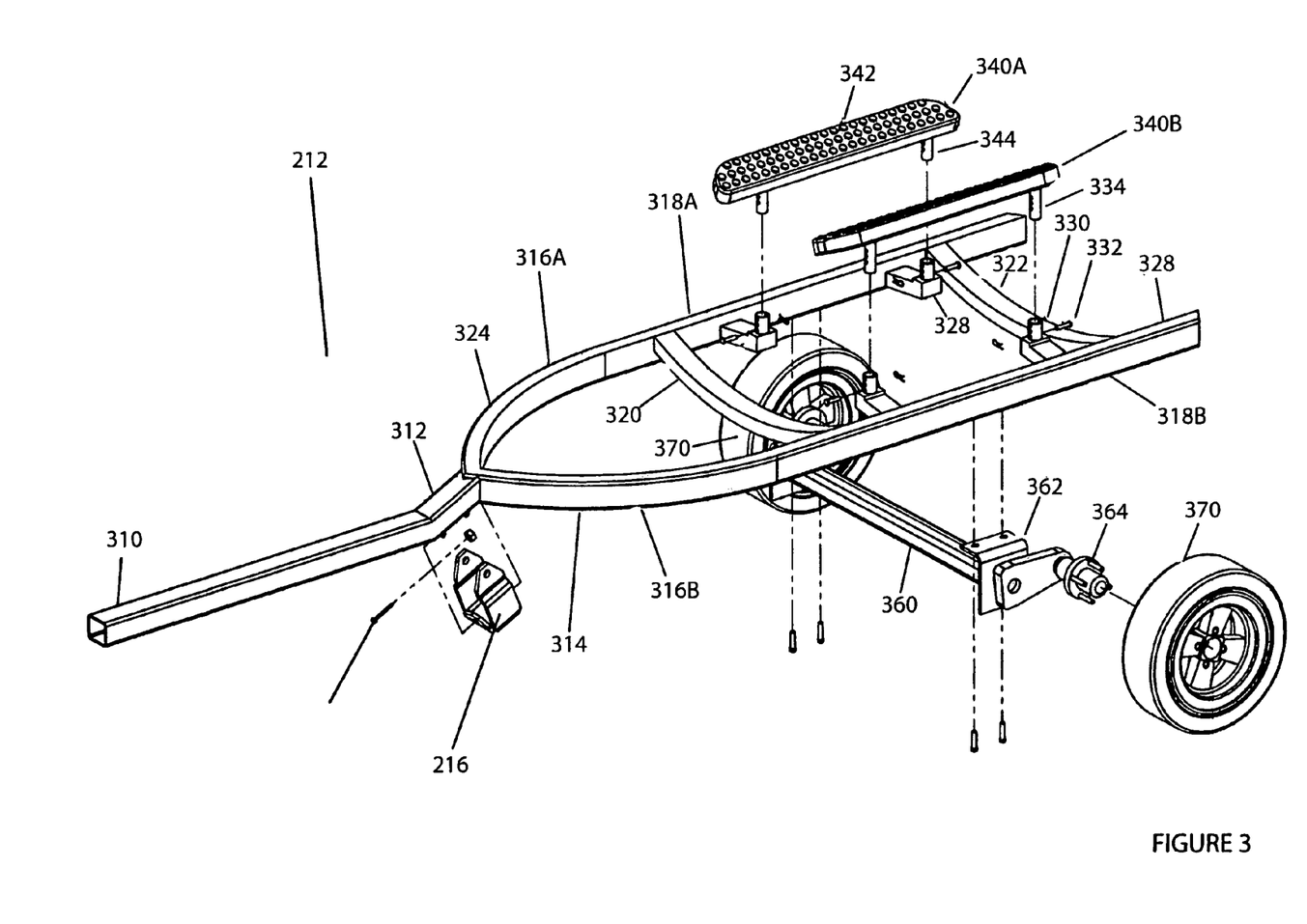
FIG. 3 is a perspective view of the trailer component of a personal watercraft transport system in accordance with embodiments described herein.
Figures 4A, 4B:
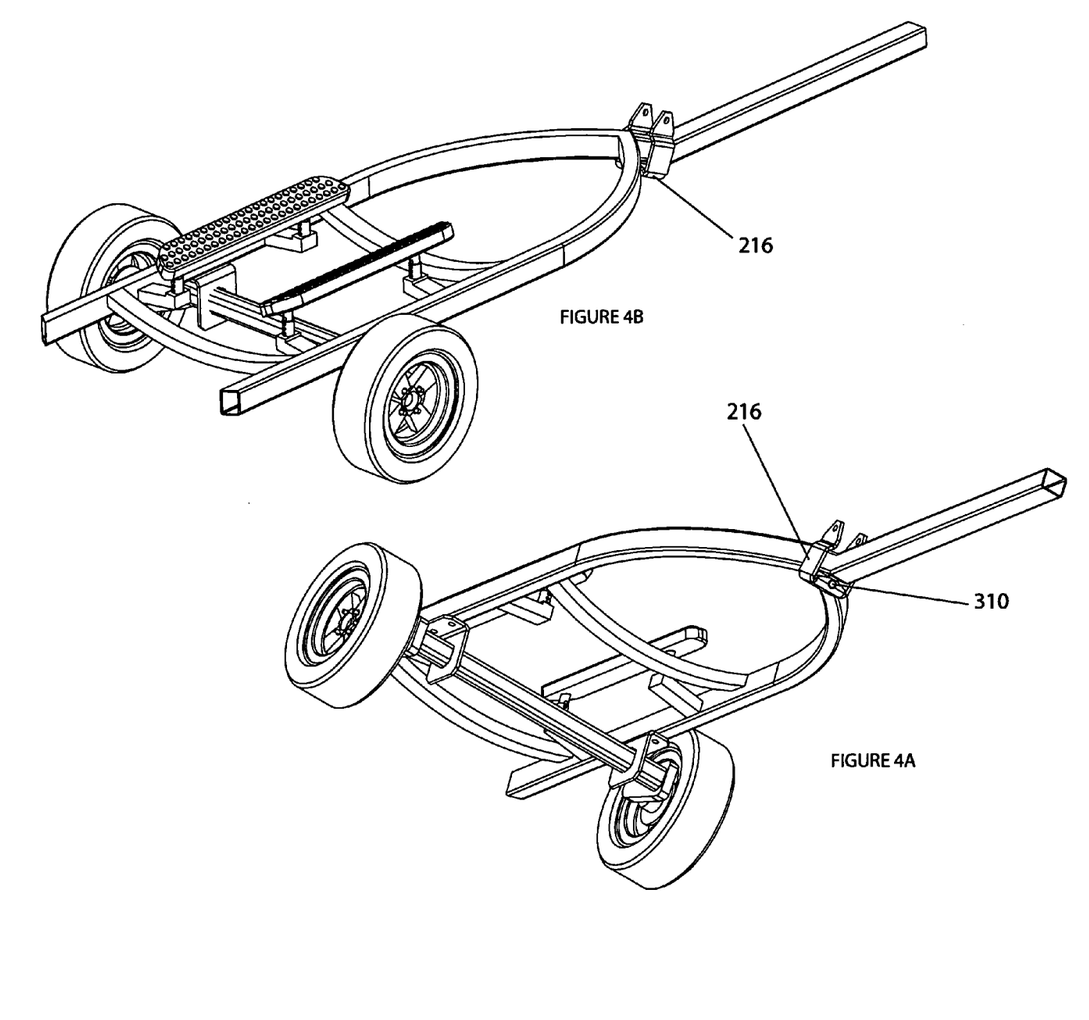
FIG. 4A is a perspective view of the assembled trailer of the personal watercraft transport system when viewed from under the trailer.
FIG. 4B is a perspective view of the assembled trailer when viewed from above.
Figures 8A, 8B:
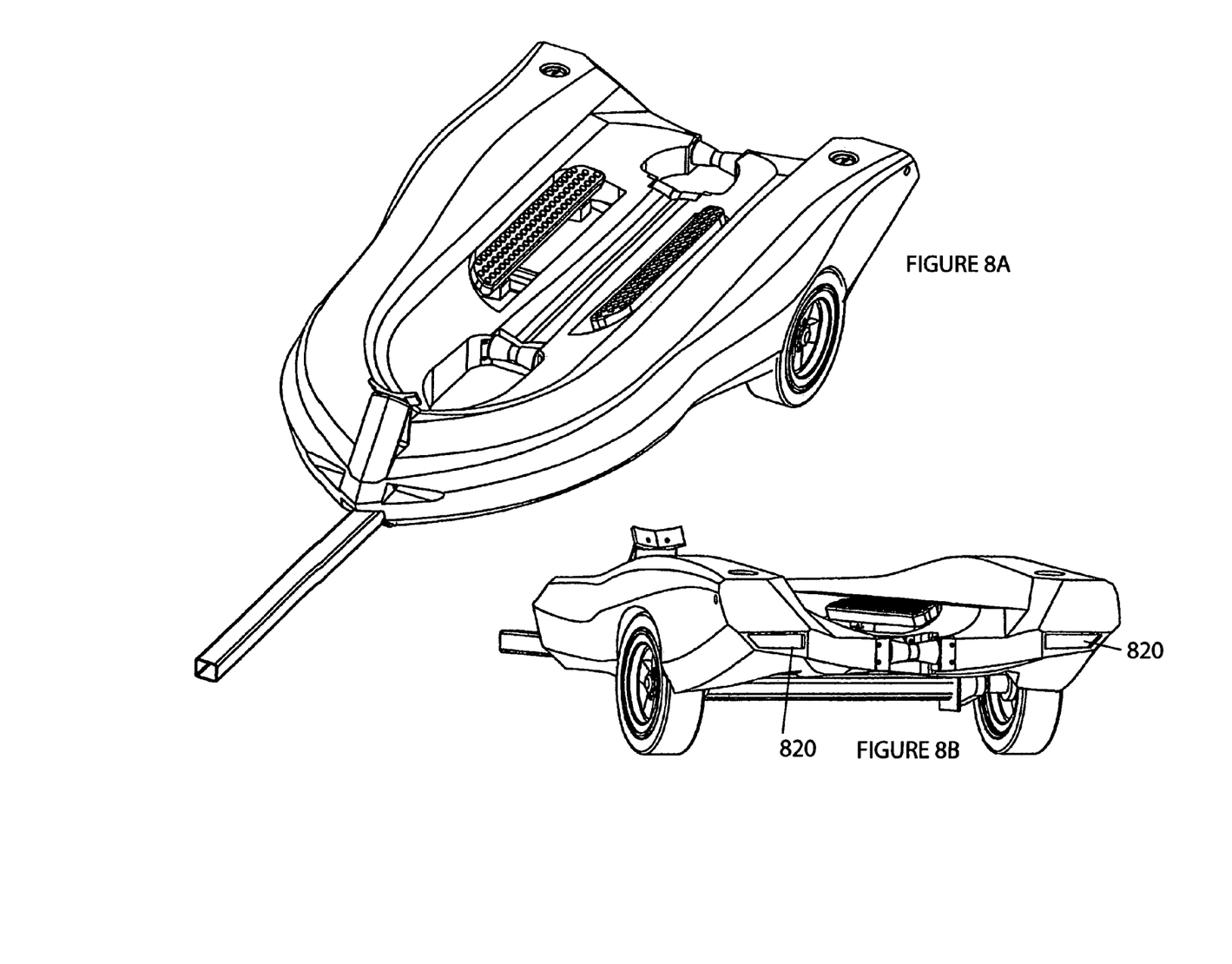
FIGS. 8A and 8B are angled perspective views of the assembled personal watercraft transport system in accordance with embodiment described herein.

FIG. 3 shows a perspective view of the frame 314 of the trailer 212. FIGS. 4A and 4B provide other perspectives of the assembled frame 314. The frame 314 is made from lightweight and rigid material, such as aluminum or light metal or rigid plastic or composite material that has a density greater than water so that when the trailer 212 is in water the trailer 212 sinks. At the front of the frame 314, there is a square, cylindrical, or rounded tube 310 to engage and mount onto a ball and hitch or other removable attachment to a vehicle. Electrical connections (not shown) are provided for safety so that the turn signals, backup, and brake lights (not shown) on the trailer 212 can be installed and function as is known in the art. Water-sealed electrical connections 820 can also be installed into the rear of the floatable body 214, as best seen in FIG. 8.

FIG. 3 further illustrates the tube 310 extending linearly along the horizontal from the vehicle with an uplifting spacer 312 extending elevationally away from ground level at a slight angle to join with the frame 314 of the trailer 212 to elevate the trailer 212 from the same elevation as the hitch (not shown). The elevationally angled spacer 312 alleviates stress on the tube 310 when the personal watercraft transport system is in water for loading and unloading the personal watercraft. At the elevationally angled spacer 312, the frame 314 comprises two arcuate sections 316A and 316B that separate from each other extending into two lengthwise sections 318A and 318B extending to the rear of the frame 314. In between the lengthwise sections 318A and 318B, there may be one or more bowed cross members 320 and 322 to maintain the distance of the lengthwise sections 318A and 318B from each other and to provide some flexible structural support. Note that in FIG. 3 the lengthwise sections 318A and 318B are parallel; shown in FIG. 6 the lengthwise sections may also be arcuate.

Along each lengthwise section 318A and 318B are two mounting brackets 328 extending inwardly from its respective parallel section. The mounting brackets 328 are spaced from each other along the length of each parallel section 318A at a distance to accommodate corresponding mounting fixtures 344 on the underside and along the length of two bunks 340A and 340B for attachment of the bunks 340A, 340B onto each respective parallel section 318A and 318B. A fastening device 330 is used to securely fasten the bunks onto the parallel sections. One fastening device may be a hollow rigid cylinder 330 mounted onto the frame that may be welded or otherwise securely mounted near the most inward edge of each mounting bracket 328 with height alignment holes machined through an outer diameter of the frame cylinder 330. On the underside of the bunks 340A and 340B are corresponding and mating bunk outer cylinders 344, which may be adjusted in height using, e.g., a cotter pin, and moving the bunk cylinder 344 to different heights on the outside of the frame cylinder 330. The fastening method 330 preferably is one that will not break nor be easily displaced. The bunks 340A and 340B are provided with a gripping non-scratch surface 342 and are slightly tipped downwardly towards the interior of the frame 212 to accommodate the shape of the hull of the watercraft. During transport of the watercraft, the watercraft contacts with the bunks 340A, 340B which support the weight of the watercraft, rather than the floatable body 214 of the watercraft system. An axle 360 extends below and along the width of the frame 212 between the cross members 320, 322 to connect with wheels and mounted tires 370 by any of several mechanisms shown 362, 364 or any other mechanism know to those of skill in the art. Preferably, axle 360 is a torsion bar suspension system.

Figure 5:
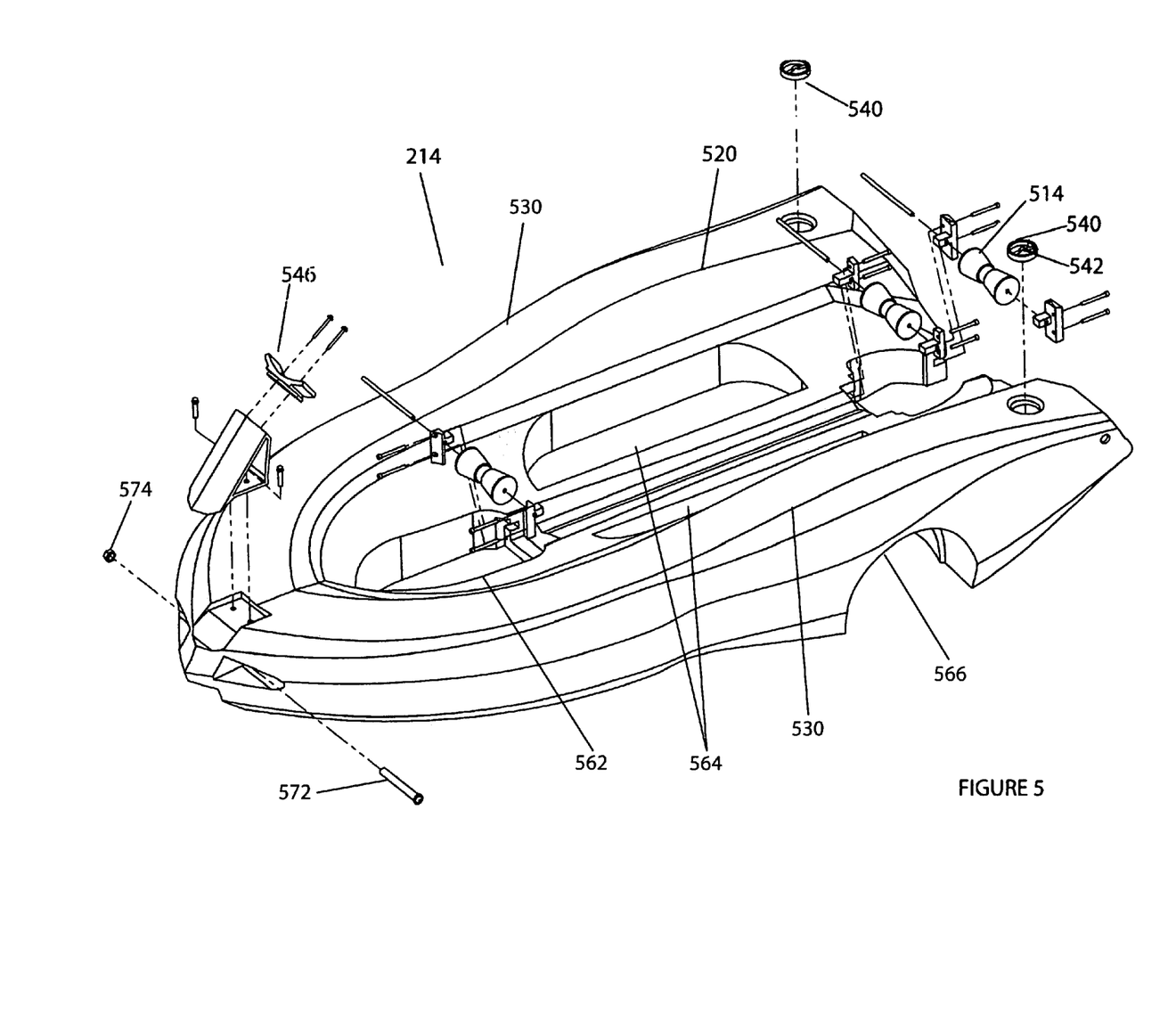
FIG. 5 is a perspective view of the disassembled floatable body of the personal watercraft transport system in accordance with embodiments described herein.

The floatable body 214 of the personal watercraft transport system 210 is shown in FIG. 5. The floatable body 214 is a manufactured from low density foam-filled polyethylene or other material preferably using a rotationally molded process. The floatable body 214 floats on the surface of the water and so must be made from a foam-like material having a density lower than water such that even with the watercraft 110 mounted, the floatable body 214 and watercraft 110 float together. The material from which the floatable body 214 is made must be durable but still must not be so rigid and/or sharp to damage the hull of the personal watercraft. The floatable body 214 is attached to the frame 212 by means of a hinge 216 located towards the front of the floatable body 214 and the frame 212 and removably attached to the rear by means of a releasable latch or L-shaped rotatable bar (not shown) that may be integral with or mounted to securing mechanisms 540, as described below.

A hinge 216 connects the floatable body 214 to the trailer 212, thereby eliminating a hand winch by which to attach a personal watercraft onto a typical trailer, so that when the trailer 212 is on the slope and under the water on the surface of the ramp, the floatable body floats above the trailer 212 while still being attached to it by the hinge 216. This arrangement stabilizes the floatable body making it easier for loading and unloading the personal watercraft onto and out of the floatable body 214. This flotation capability of the floatable body 214 remediates any difficulties associated with the slope of the loading ramp because regardless of how steep the slope is, the floatable body 214 and the personal watercraft still float and are still visible to the driver of the vehicle to which the transport system 110 is attached. Note that because the tube 310 may be a meter or more longer than a typical trailer hitch, there is greater flexibility when backing up into the water for loading and unloading the personal watercraft.

The floatable body 214 includes rollers 512 and 514 within the interior along the longitudinal axis of the body and connected between the two interior walls of the floatable body 214. The rollers 512 are located front of the center of the floatable body 214, and rollers 514 are located near the rear of the floatable body 214. Rollers 512, 514 are preferably made from a durable and hard material such as polyurethane and may even have some scales or made from a rough or other frictional surface along the outer circumference to grab the bottom of the watercraft 110 and facilitate movement of the watercraft 110 out of and into the interior of the floatable body 214 when unloading and loading. The rollers 512, 514 are preferably tapered downwards to the center along the longitudinal axis to form right cylindrical truncated cones to facilitate alignment of the watercraft upon entry into the floatable body 214.

Figure 6:
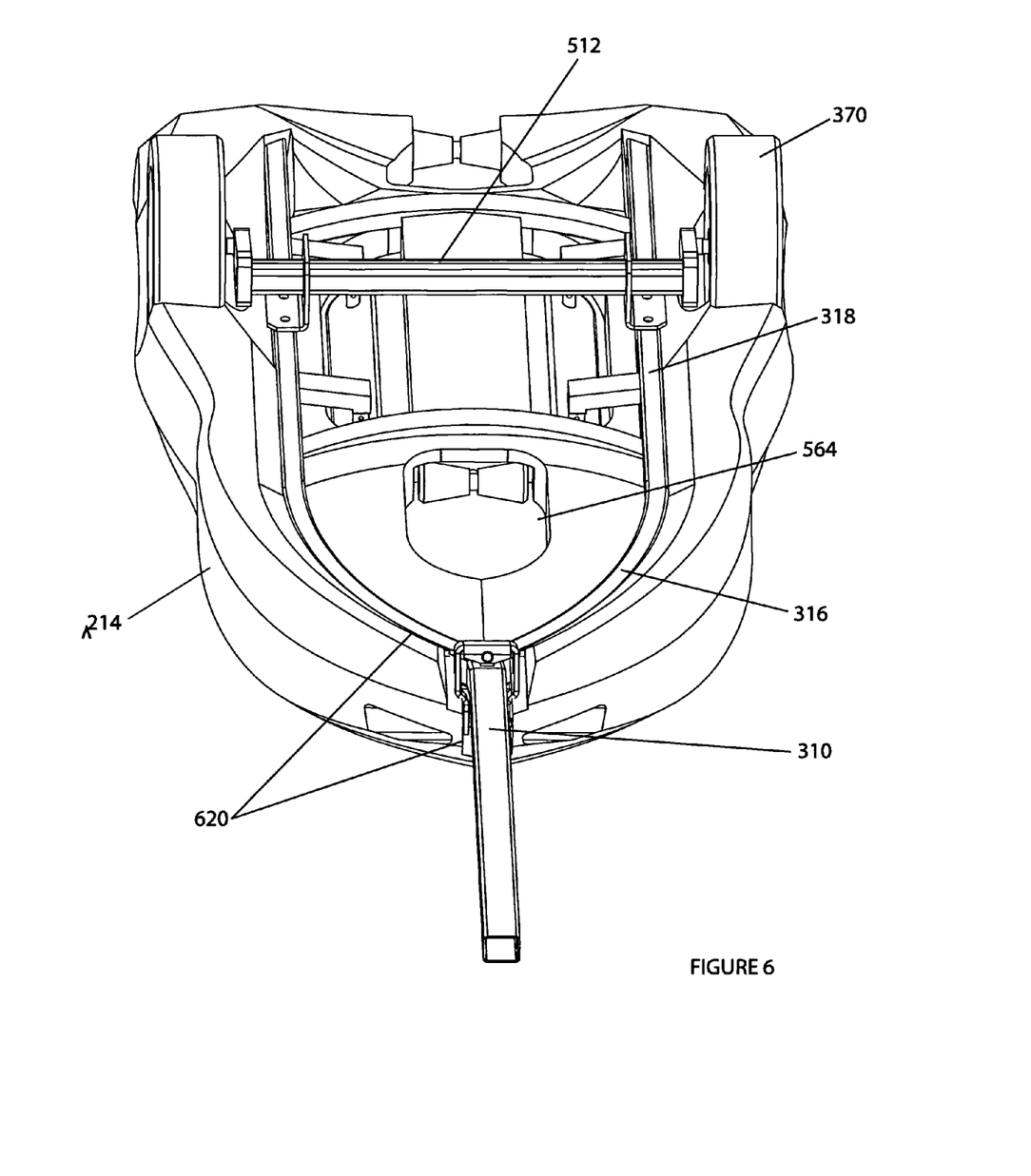
FIG. 6 is a perspective view of the underside of the floatable body illustrating channels into which the frame is inserted according to an embodiment described herein

As can be seen in FIGS. 5 and 6, the floatable body 214 has one or more voids 562, 564 that eliminate some of the bulk and weight of the floatable body 214 and allow for drainage of the water. Cutouts 566 are also provided for the wheels. An inner surface 520 of the floatable body 214 is contoured or angled at a downward slope from the upper surface 530 towards the interior to facilitate alignment of the watercraft 110 into the floatable body 214. The upper surface 530 of the floatable body 214 is preferably laminated or coated with a material that provides a slip-proof surface for standing when entering or departing from the watercraft 110 and loading and unloading the trailer in the water. The person does not have to get into the water to load and unload the trailer in the water and enter or depart from the watercraft 110. The use of the personal watercraft transport system can best be seen in FIGS. 9A-9C.

Figure 9A:
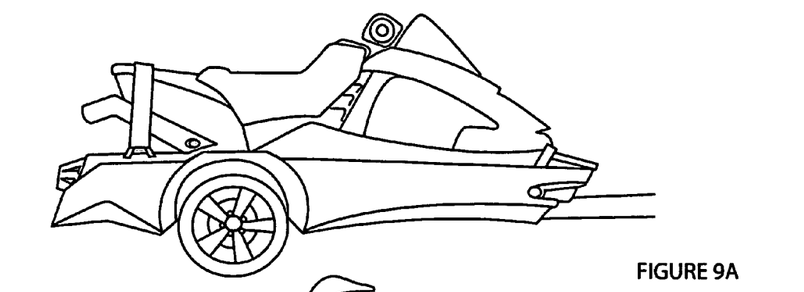
FIG. 9A is a side view of the assembled personal watercraft transport system having a personal watercraft.
Figure 9B:
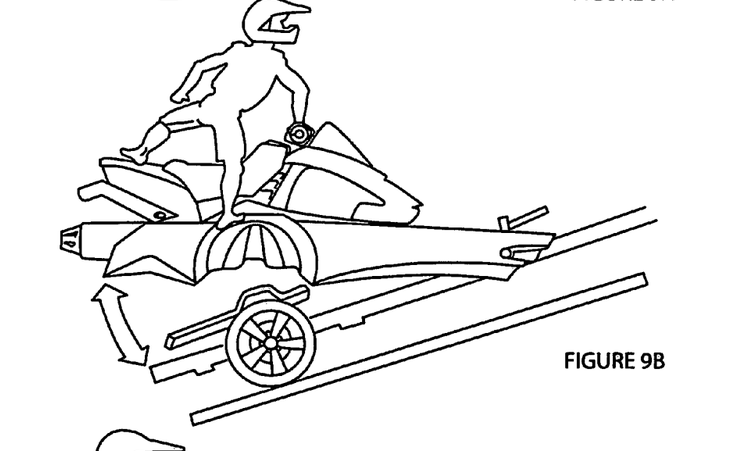
FIGS. 9B and 9C are side views of an interpretation of a person loading the personal watercraft into the assembled personal watercraft transport system.
Figure 9C:
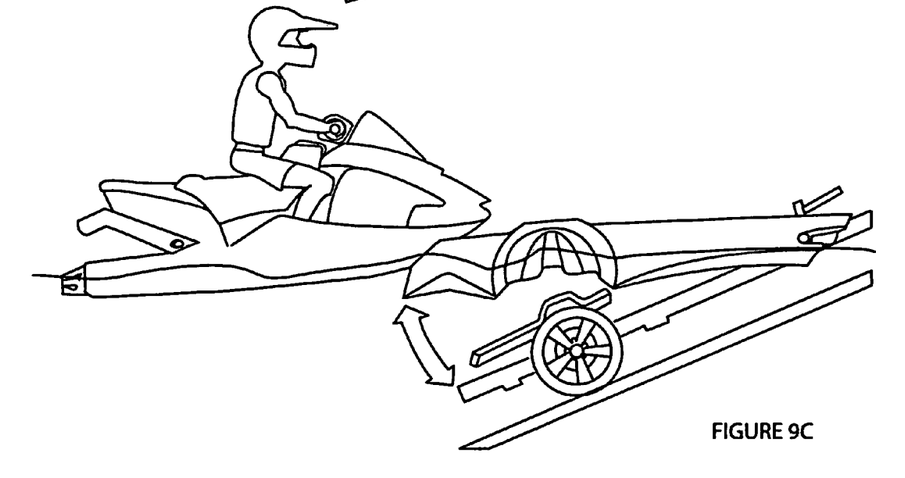

Securing mechanisms 540A and 540B extending through the upper surface 530 of the floatable body 214 not only secures the personal watercraft to the floatable body 214 but also secures the floatable body 214 to the frame 212. One embodiment is a circular twist lock 540A and 540B having an arced rod, strap or loops 542 extending across its diameter by which to attach bungee cords or other ropes, straps, etc to strap down the watercraft onto the floatable body 214. An embodiment of a strap-hold down is shown in FIG. 9A. Attached to the underside of the securing mechanisms may be a L-shaped metal or rigid rod having about a ninety-degree extension as a bottom locking member or so such that when the a circular latch attached to the L-shaped rod within securing mechanism 540A, 540B is rotated in one direction the bottom locking member the extends away from the cross member 322 of the frame 212 towards the rear of the frame and then when the circular twist lock 540A, 540B is rotated 180 degrees or so, the bottom locking member rotates around the cross member 322 to secure the floatable body 214 to the frame 212.

A stop 546 can be provided at the front of the floatable body 214 for alignment of the watercraft 110 into the floatable body 214 and can be used to secure the watercraft onto the front of the transport system.

Referring to FIGS. 3 and 4A and 4B, hinge 216 is the mechanism by which the floatable body 214 can float above the frame 212 and still be attached to it. Hinge 216 wraps around three sides of the spacer 312; note the angle of the spacer 312 with respect to the shaft 310 allows the floatable body 214 to float above the frame 212 in water without putting stress onto the shaft 310. Hinge 216 has a 4-way movement: not only does it move in a vertical pitch direction up and down that allows that floatable body 214 to float above the frame 212 as described, but hinge also has a roll pivot surface and pin, shown more clearly in FIGS. 3 and 4A that allows the floatable body 214 to rock and roll in the water. One skilled in the art will understand that the hinge 216 will be experiencing multiple stresses and must be manufactured accordingly from a durable material. As can be seen in FIG. 5 a pin 572 with a locking bolt or other fastener 574 extends through a receiving hole in the front of the floatable body 214 and then through corresponding holes in the hinge, shown in FIG. 3, to secure the floatable body 214 to the frame 212.

Best seen in FIG. 6, the underside of the floatable body preferably has channels 620 that are tapered in an upward and inward directions from the underside to accommodate the arcuate and parallel frame sections 316A, 316B, 318A and 318B so that the floatable body 214 of the personal watercraft transport system is guided onto the trailer and will drop down onto the frame sections as the personal watercraft transport system is removed from the water.

Figure 7A:
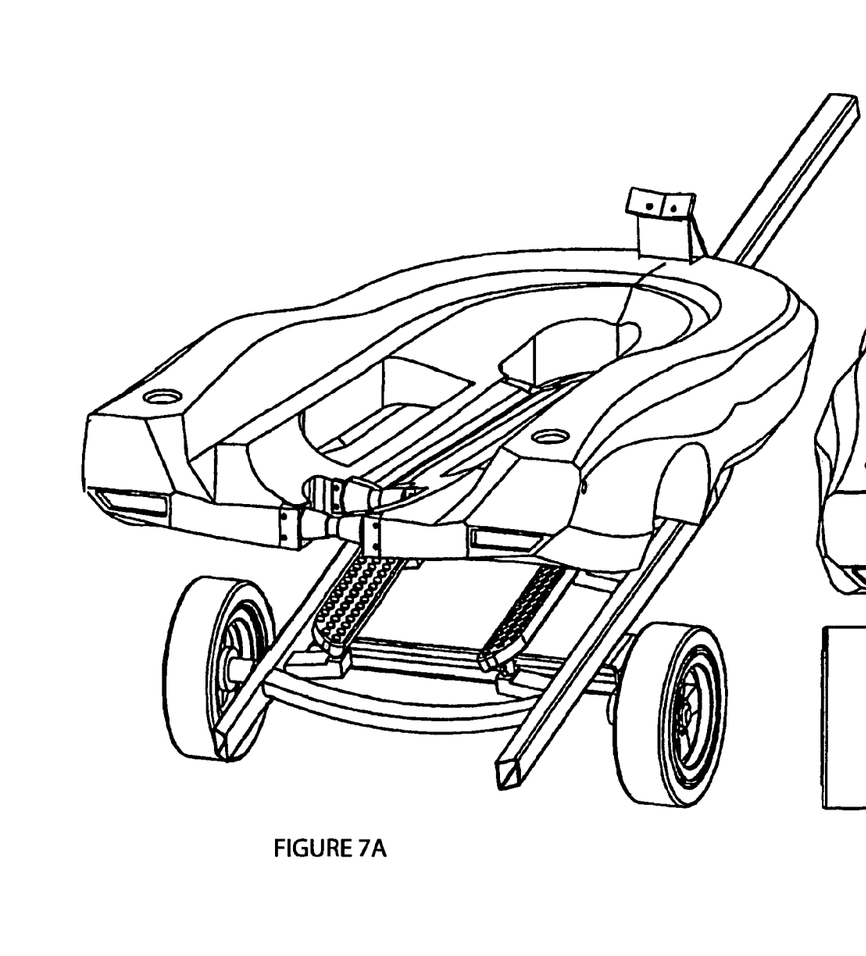
FIGS. 7A and 7B are rear perspective views of the assembled water transport system in accordance with embodiments described herein.
Figure 7B:
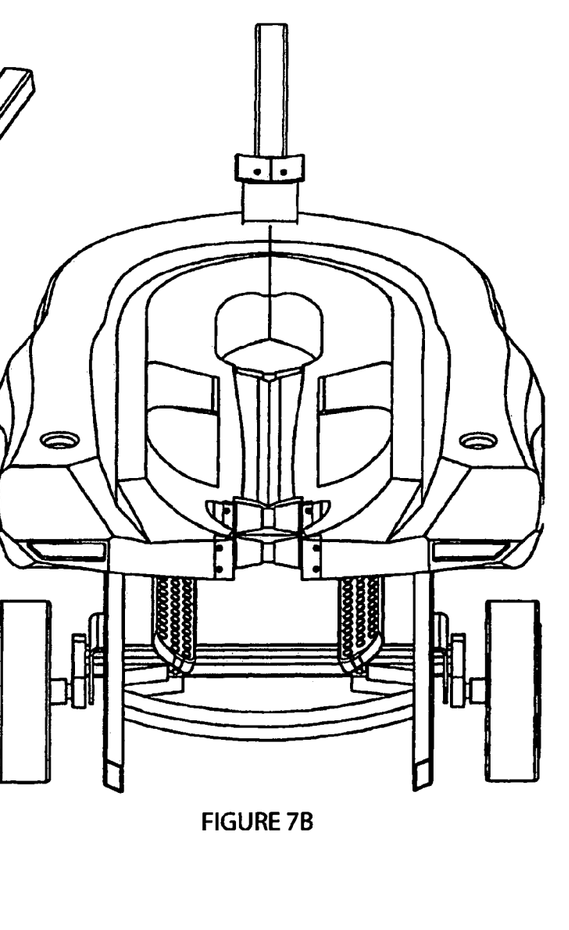

FIGS. 7A, 7B and 8A, 8B are line drawings of several embodiments of the assembled personal watercraft transport system. FIGS. 7A and 7B show the floatable body 214 separated from the trailer 212. FIGS. 8A and 8B provide illustrations of the assembled personal watercraft transport system fitted onto the trailer 212. The interior of the floatable body 214 can be molded or otherwise sculpted to mate with the outer surface of the hull of various watercraft. When used for jet-skis, the body is molded in a general shape to accommodate different shapes and sizes of different brands of personal jet-skis. The preferred embodiment is contemplated for personal watercraft, such as jet skis, canoes, kayaks, and small V-bottomed fishing boats.

The concepts of the present invention can be further extended to a variety of other applications that are clearly within the scope of this invention. Having thus described the present invention with respect to preferred embodiments as implemented, it will be apparent to those skilled in the art that many modifications and enhancements are possible to the present invention without departing from the basic concepts as described in the preferred embodiment of the present invention. Therefore, what is intended to be protected by way of letters patent should be limited only by the scope of the following claims.

What is claimed is:

1. A personal watercraft transportation assembly, comprising:
a trailer having a frame, an axle, and wheels, the frame comprising a rigid tube in a generally Y-shape having one extending tube with a forward direction and separating into separated extensions towards a rear direction of the frame, the extending tube having an attachment mechanism to attach to a vehicle in the forward direction and having an elevationally angled section proximate to the separated extensions;
a floatable body molded on the top side to accommodate the hull of a personal watercraft; and
a hinge attached to the elevationally angled section connecting the trailer to a front end of the floatable body so that when the trailer is at least partially submerged in water, the floatable body floats on the surface of the water.

2. The watercraft transport arrangement of claim 1, wherein the hinge allows a range of motion for pitch to allow the floatable body to float as the trailer sinks into the water, and provides a smaller range of range of motion for roll and yaw.

3. The watercraft transport arrangement of claim 1, wherein the rigid tube further comprises one or more structural cross members between the separated extensions.

4. The watercraft transport arrangement of claim 1, wherein the floatable body has a skid-proof upper surface.

5. The watercraft transport arrangement of claim 1, wherein an underside of the floatable body further comprises a generally Y-shaped channel to receive the generally Y-shaped rigid tube of the frame.

6. The watercraft transport arrangement of claim 1, wherein the floatable body further comprises at least one void in an interior for placement of a hull of a personal watercraft.

7. The watercraft transport arrangement of claim 6, wherein the floatable body further comprises at least one roller along a longitudinal axis of the floatable body to facilitate movement of a personal watercraft into and out of the floatable body.

8. The watercraft transport arrangement of claim 1, further comprising a releasable locking mechanism on a rear portion of the floatable body and connected to a rear portion of the trailer to secure the rear portion of the floatable body to the rear portion of the trailer.

9. The watercraft transport arrangement of claim 1, wherein the floatable body further comprises water-sealed electrical compartments at a rear portion for installation of electrical lights.

10. The watercraft transport arrangement of claim 1, wherein the trailer further comprises waterproof electrical compartments at a rear of the trailer for installation of electrical lights.

11. The watercraft transport arrangement of claim 1, wherein the trailer further comprises two bunks mounted on the separated rigid extensions to provide support for a personal watercraft on the trailer.

12. A watercraft transport arrangement, comprising:

a trailer having a frame made from rigid material and having a generally curved Y-shape with a forward extension and two rearward extensions; at least one cross member structurally connecting the two rearward extensions; an axle connected to the two rearward extensions between the cross members for attachment of wheels; at least two bunks mounted on each of the two rearward extensions and angled downward and inward towards a longitudinal axis of the frame upon which a personal watercraft can be supported; an elevationally angled member of the forward extension proximate to the two rearward extensions;

a floatable body made from a semi-rigid material molded on a upper and interior portion to accommodate a hull of a personal watercraft; one or more channels on an underside of the floatable body into which the frame is insertable; one or more rollers along a center longitudinal axis of the floatable body to facilitate movement of the personal watercraft into and out of the floatable body; and a hinge mounted on the elevationally angled member of the forward extension of the frame and a secure attachment connected to the floatable body; the hinge having movement to allow pitch of the floatable body so that it can float on water as the trailer sinks into the water and limited yaw and roll movements of the floatable body when floating.

13. The watercraft transport arrangement of claim 12, further comprising an electrical pathway extending from the forward extension of the trailer to electrical connections at the rear of the trailer.

14. The watercraft transport arrangement of claim 13, further comprising an electrical pathway extending through a forward portion of the floatable body to a rear portion of the floatable body to water-proof lights.

15. The watercraft transport arrangement of claim 13, further comprising a releasable locking mechanism at a rear portion of the floatable body connected to a rear portion of the trailer to secure the floatable body to a rear portion of the trailer.

* * * * *